US010443490B1

United States Patent
Choi

(10) Patent No.: US 10,443,490 B1
(45) Date of Patent: Oct. 15, 2019

(54) VARIABLE COMPRESSION RATIO ENGINE

(71) Applicants: HYUNDAI MOTOR COMPANY, Seoul (KR); KIA MOTORS CORPORATION, Seoul (KR)

(72) Inventor: Myung Sik Choi, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/135,659

(22) Filed: Sep. 19, 2018

(30) Foreign Application Priority Data

Jun. 26, 2018 (KR) .................. 10-2018-0073164

(51) Int. Cl.
*F02B 75/04* (2006.01)
*F15B 15/26* (2006.01)
*F16C 7/00* (2006.01)
*F16C 7/06* (2006.01)

(52) U.S. Cl.
CPC .......... *F02B 75/045* (2013.01); *F15B 15/261* (2013.01); *F16C 7/06* (2013.01)

(58) Field of Classification Search
CPC .......... F16C 7/06; F02B 75/04; F02B 75/045; F02B 75/048; F15B 15/261
See application file for complete search history.

(56) References Cited

U.S. PATENT DOCUMENTS

| 6,497,203 | B1 * | 12/2002 | Rao ........................ | F02B 75/045 |
|   |   |   |   | 123/48 B |
| 6,499,446 | B1 * | 12/2002 | Rao ........................ | F02B 75/045 |
|   |   |   |   | 123/48 B |
| 6,604,496 | B2 * | 8/2003 | Bartsch ................. | F02B 75/045 |
|   |   |   |   | 123/78 E |
| 7,685,974 | B2 * | 3/2010 | Berger .................. | F02B 75/045 |
|   |   |   |   | 123/48 B |
| 9,670,952 | B2 * | 6/2017 | Melde-Tuczai ....... | F02B 75/045 |
| 2016/0237889 | A1 * | 8/2016 | Melde-Tuczai ....... | F02B 75/045 |
| 2018/0266313 | A1 * | 9/2018 | Melde-Tuczai ....... | F02B 75/045 |

FOREIGN PATENT DOCUMENTS

KR   10-2011-0037394 A   4/2011

* cited by examiner

*Primary Examiner* — Adam D Rogers
(74) *Attorney, Agent, or Firm* — Brinks Gilson & Lione

(57) ABSTRACT

Disclosed is a variable compression ratio engine. When it is desired to change a compression ratio of fuel/air mixture, a first latching pin or a second latching pin is moved to restrict or allow rotation of a first connecting rod so that the first connecting rod moves linearly with respect to a second connecting rod, thereby variably adjusting the entire length of the connecting rod assembly and changing the compression ratio.

9 Claims, 7 Drawing Sheets

VARIABLE COMPRESSION RATIO ENGINE

CROSS REFERENCE TO RELATED APPLICATION

The present application claims priority to and the benefit of Korean Patent Application No. 10-2018-0073164, filed on Jun. 26, 2018, the entire contents of which are incorporated herein by reference.

FIELD

The present disclosure relates to a variable compression ratio engine.

BACKGROUND

The statements in this section merely provide background information related to the present disclosure and may not constitute prior art.

Generally, variable compression ratio (VCR) is a technology to adjust the compression ratio of a fuel/air mixture in an internal combustion engine according to the operation condition of a vehicle.

That is, during a low-load driving condition of an engine such as high speed driving, VCR increases the compression ratio of the fuel/air mixture to decrease fuel consumption, and during a high-load driving condition such as accelerating driving, VCR decreases the compression ratio to increase the supercharged pressure of a turbo charger, thereby preventing knocking of an engine while improving fuel efficiency and engine output.

Some conventional variable compression ratio engines accomplished the variable compression ratio by changing the volume of a combustion chamber or partially deforming a piston using a linkage mechanism.

However, such conventional variable compression ratio engines have problems in that they need to excessively change their design to widen a range of the variable compression ratio, and a variable compression mechanism is complicated.

Thus, there is a proposal to provide a variable compression ratio engine capable of eccentrically rotating a piston pin with hydraulic pressure to change the height of a piston.

The foregoing is intended merely to aid in the understanding of the background of the present disclosure, and is not intended to mean that the present disclosure falls within the purview of the related art that is already known to those skilled in the art.

SUMMARY

The present disclosure provides a variable compression ratio engine capable of changing the length of a connecting rod so as to simply implement a variable compression ratio mechanism.

In one form of the present disclosure, a variable compression ratio engine includes: a first connecting rod having a first end side to which a piston is coupled, and a second end side; a second connecting rod having a first end side formed as a hollow insert through which the second end side of the first connecting rod is reciprocatingly inserted, and a second end side coupled to a crank shaft; and a latching unit configured such that latching pins are movable in latching holes of the first and second connecting rods so as to allow or restrict a linear motion of the first connecting rod relative to the second connecting rod, thereby inhibiting or preventing the movement of the first connecting rod after having moved towards the piston or the crank shaft.

The latching unit may include: a first latching mechanism having a first latching hole and a first latching pin movable in the first latching hole so as to support the first connecting rod having been raised towards the piston and restrict a motion thereof; and a second latching mechanism having a first hole part formed in the first connecting rod, a second hole part formed in the second connecting rod, and a second latching pin engagingly movable in at least one of the first hole part and the second hole part, which are aligned with each other, so as to restrict a motion of the first connecting rod having been lowered towards the crank shaft.

The first latching hole of the first latching mechanism may be provided in the second connecting rod at a position corresponding to the second end side of the first connecting rod and extend in a direction orthogonal to a movement direction of the first connecting rod; and wherein the first latching pin of the first latching mechanism may be movable longitudinally towards a middle portion of the first latching hole of the first latching mechanism so as to support the second end side of the first connecting rod.

The first latching mechanism may further include: an oil supply unit providing oil pressure to move the first latching pin towards the middle portion or either end side of the first latching hole; and a first latching spring providing an elastic restoring force to the first latching pin moved by the operation of the oil supply unit.

The first connecting rod may be centrally provided, on the second end side thereof, with a first latching stopper protruded towards the first latching hole, wherein two first latching pins may be respectively provided on opposite lateral sides of the first latching stopper, wherein the first latching spring may be disposed between and supported by the two first latching pins, and wherein a first oil path may be connected to opposite end sides of the first latching hole to supply oil thereto from the oil supply unit.

The first connecting rod may be centrally provided, on the second end side thereof, with a first latching stopper protruded towards the first latching hole, wherein two first latching pins may be respectively provided on opposite lateral sides of the first latching stopper, wherein two first latching springs may be disposed between the opposite end sides of the first latching hole and the two first latching pins, respectively, and wherein a first oil path may be connected to the middle portion of the first latching hole and the two first latching pins to supply oil from the oil supply unit.

The first hole part of the second latching mechanism may be formed in an outer intermediate surface of the first connecting rod; wherein the second hole part of the second latching mechanism may be formed in an inner intermediate surface of the hollow insert on the second end side of the second connecting rod, into which the first connecting rod is inserted; and wherein the second latching pin may be movable towards the first hole part to engage with both the first and second hole parts, or towards the second hole part to move away and disengage from the first hole part.

The second latching mechanism may further include: an oil supply unit providing oil pressure to move the second latching pin towards the first hope part or the second hole part; and a second latching spring providing an elastic restoring force to the second latching pin moved by the operation of the oil supply unit.

In one another form, two first hole parts may be respectively provided on opposite sides on the outer intermediate surface of the first connecting rod, a second latching stopper may be provided between the two first hole parts, two second hole parts may be respectively provided on opposite sides on the inner intermediate surface of the hollow insert of the second connecting rod, two second latching pins may be respectively provided in the two second hole parts, two second latching springs may be disposed between the opposite end sides of the second hole parts and the two second latching pins, respectively, and a second oil path may be connected to the two first hole parts to supply oil from the oil supply unit.

According to the exemplary forms of the present disclosure, when it is desired to change the compression ratio of the fuel/air mixture, the first or second latching pin is moved to restrict or allow the rotation of the first connecting rod so that the first connecting rod moves linearly with respect to the second connecting rod, thereby variably adjusting the entire length of the connecting rod assembly and changing the compression ratio. This simple variable compression ratio mechanism advantageously reduces the costs of designing the variable compression ratio engine.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
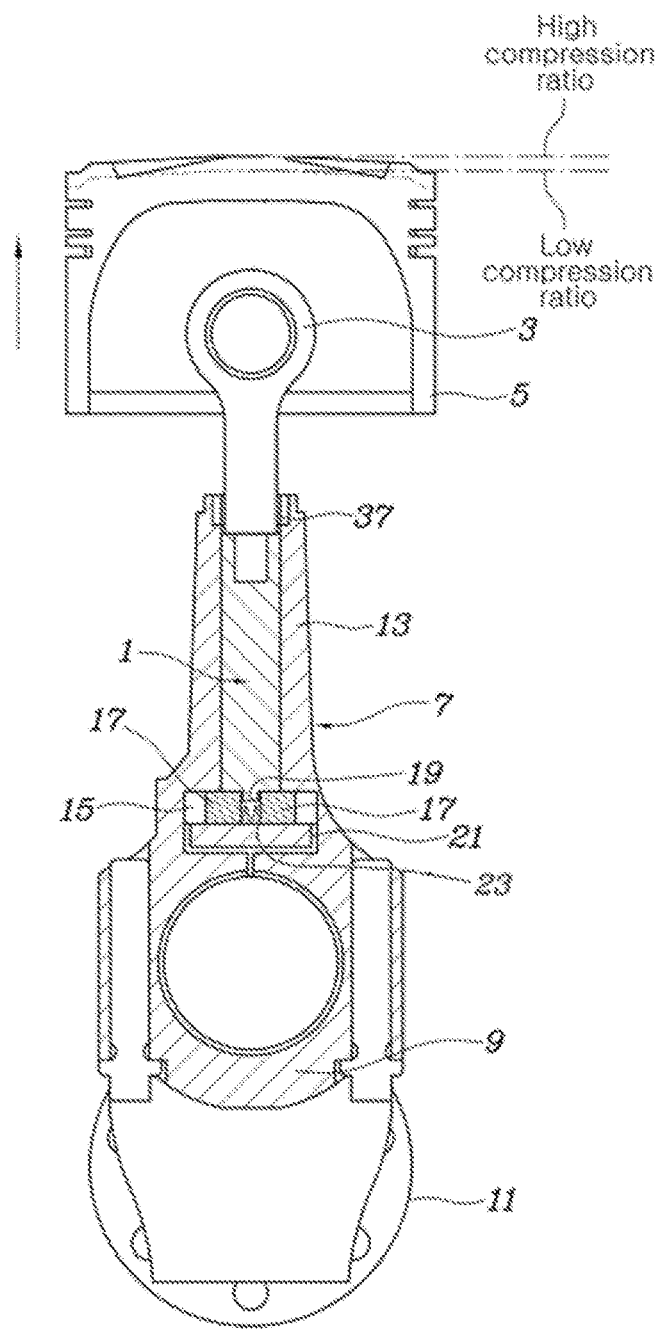
FIG. 1 is a cross-sectional view illustrating a variable compression ratio engine in which high compression ratio is accomplished according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In one form of the present disclosure, a variable compression ratio engine includes a first connecting rod 1, a second connecting rod 7, and a latching unit.

Figure 2:
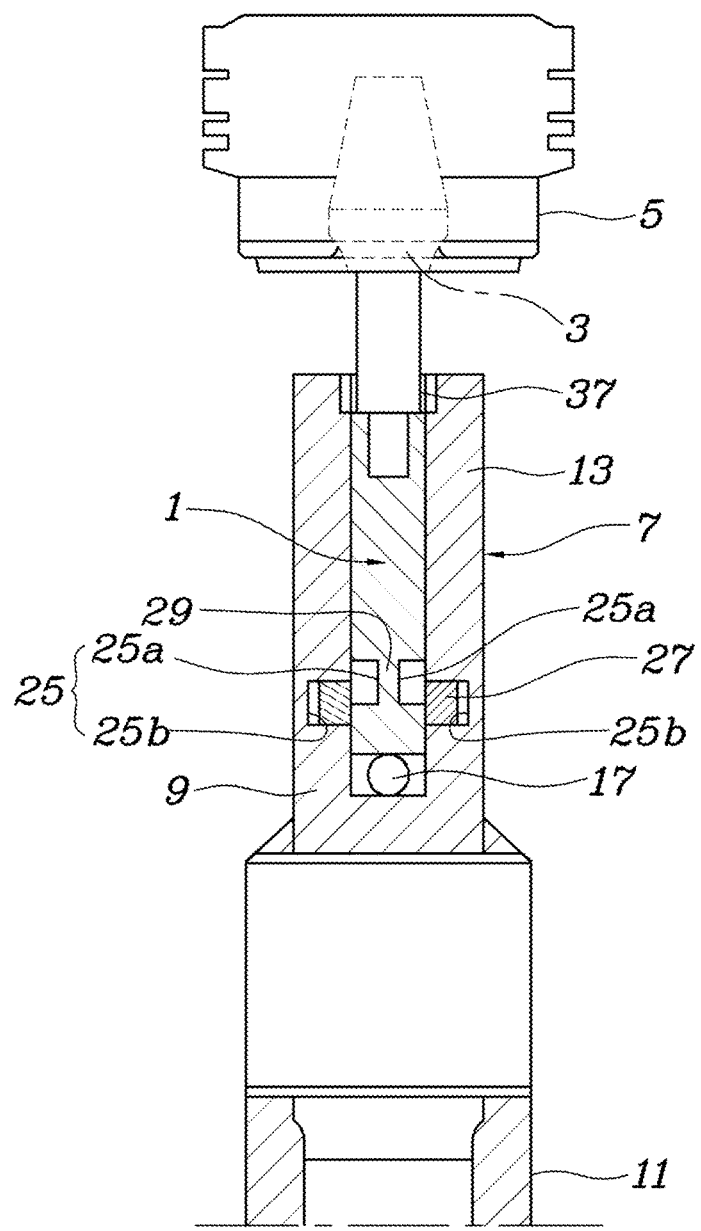
FIG. 2 is a side cross-sectional view of FIG. 1.

Referring to FIGS. 1 and 2, the first connecting rod 1 has a first end side 3 with a small bore, to which a piston 5 is coupled, and a second end side.

The second connecting rod 7 has a first end side with a hollow insert 13, through which the second end side of the first connecting rod 1 is reciprocatingly inserted, and a second end side 9, which is coupled to a crank shaft 11.

The latching unit is configured such that latching pins are movable in latching holes of the first and second connecting rods 1 and 7 so as to allow or restrict a linear motion of the first connecting rod 1 relative to the second connecting rod 7, thereby preventing the movement of the first connecting rod 1 after having moved towards the piston 5 or the crank shaft 11.

Here, the latching unit includes a first latching mechanism and a second latching mechanism.

Referring to FIGS. 1 and 2, the first latching mechanism is configured such that a first latching pin 17 moves in a first latching hole 15 of the second connecting rod 7 to a position where the first latching pin supports the bottom of the second end side of the first connecting rod 1, thereby preventing a downward motion of the first connecting rod 1, which has been raised towards the piston 5 from that position.

Figure 5:
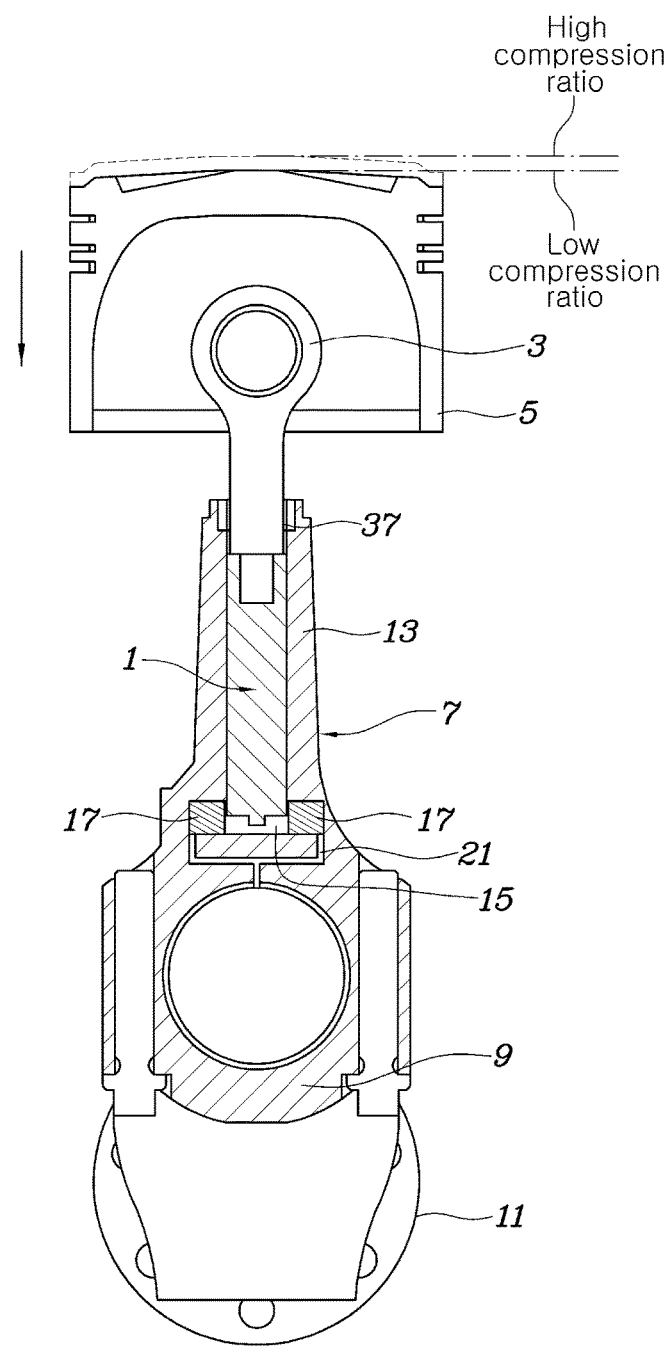
FIG. 5 is a cross-sectional view illustrating the variable compression ratio engine in which low compression ratio is accomplished according to one form of the present disclosure.
Figure 6:
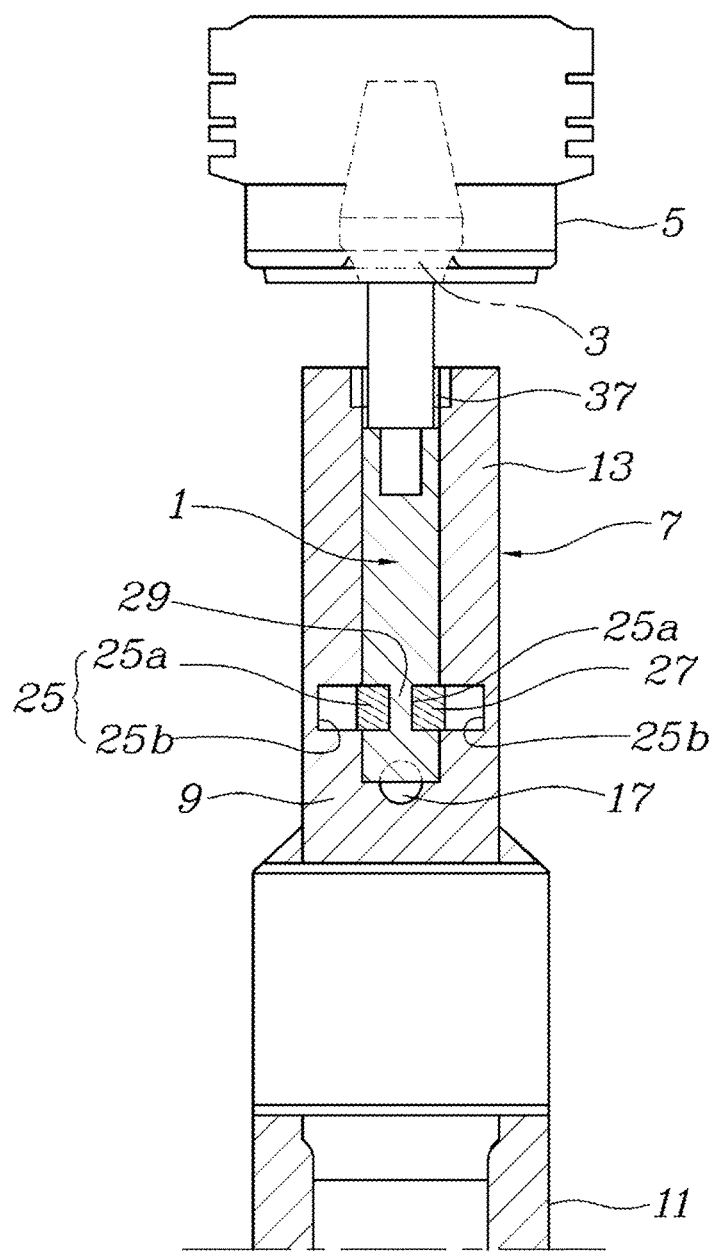
FIG. 6 is a side cross-sectional view of FIG. 5.

Further, referring to FIGS. 5 and 6, the second latching mechanism is configured such that, when the first connecting rod 1 moves downwardly towards the crank shaft 11, a second latching pin 27 moves into and engages with a combined hole, which is formed when latching holes respectively provided in the middle portions of the first and second connecting rods 1 and 7 coincide with each other, thereby inhibiting or preventing a further downward motion of the first connecting rod 1 towards the crank shaft 11.

Here, when it is desired to change the compression ratio in response to the driving condition of a vehicle, the above latching pins move in the latching holes with hydraulic pressure of oil supplied to the latching holes by means of an oil supply unit.

For example, when the first latching pin 17 moves to allow the motion of the first connecting rod 1, the first connecting rod 1 moves downwardly, and the second latching pin 27 then moves and engages with the first connecting rod 1, thereby preventing a further downward motion of the first connecting rod 1.

Thus, the first connecting rod 1 moves linearly relative to the second connecting rod 7 so as to change the entire length of a connecting rod assembly, which leads to a change in height of the piston 5 and a top dead point thereof, thereby implementing a variable compression ratio mechanism.

More specifically, referring to FIGS. 1 to 3, the configuration of the first latching mechanism is as follows.

The first latching hole 15 is formed in the hollow insert of the second connecting rod 7 at a position corresponding to the second end side of the first connecting rod 1, such that it extends in a direction orthogonal to the movement direction of the first connecting rod 1.

The first latching pin 17 is movably provided in the first latching hole 15 such that when the first latching pin moves towards the middle portion of the first latching hole 15 along the longitudinal direction thereof, it supports the second end side of the first connecting rod 1 and when the first latching pin moves away from the middle portion along the longitudinal direction thereof, it moves away from the second end side of the first connecting rod 1.

That is, when the first latching pin 17 moves to the middle portion of the first latching hole 15, the first latching pin supports the second end side of the first connecting rod 1 and thus mechanically prevents the downward motion of the first connecting rod 1.

Thus, the first latching pin restricts the downward motion of the first connecting rod 1, which has been raised, so that the height of the piston 5 is relatively increased so as to realize high compression ratio.

On the contrary, when the first latching pin 17 moves towards the end side of the first latching hole 15, the first latching pin 17 moves away from the first connecting rod 1, and does not support the second end side of the first connecting rod 1 anymore, thereby allowing the downward motion of the first connecting rod 1.

Thus, since the first connecting rod 1 is stopped by the second latching mechanism after moving downwardly, the height of the piston 5 is relatively decreased, thereby realizing low compression ratio.

Further, the first latching mechanism further includes an oil supply unit which provides oil pressure to allow the first latching pin 17 to move to the middle portion or the end side of the first latching hole 15, and a first latching spring 23 which provides an elastic restoring force to the first latching pin 17, which has been moved with the oil pressure from the supply unit.

Figure 3:
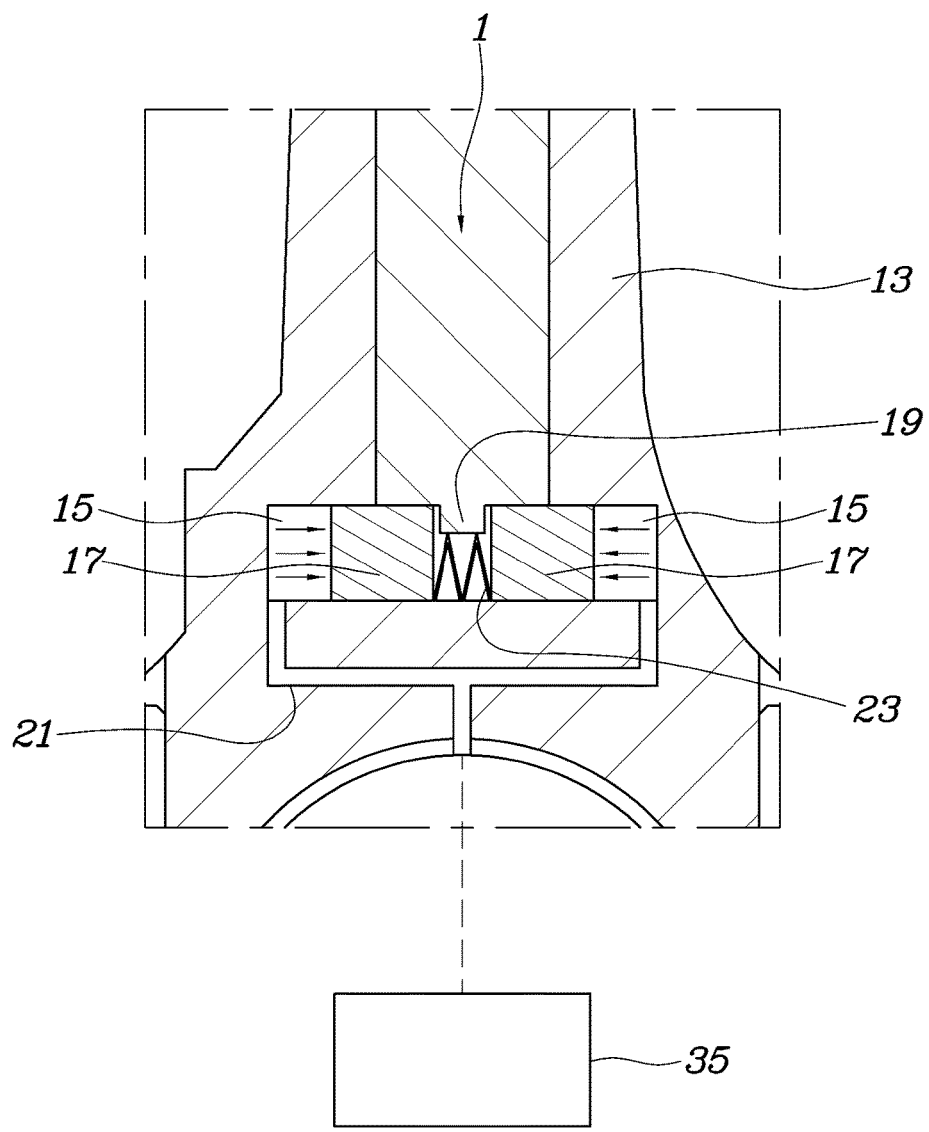
FIG. 3 is a partially enlarged view illustrating a configuration of a first latching mechanism in which a first latching pin is moved by the action of oil pressure and a first latching spring.

In one form, referring to FIG. 3, the second end side of the first connecting rod 1 is centrally provided with a first latching stopper 19 protruded towards the first latching hole 15, and two first latching pins 17 are respectively provided on opposite lateral sides of the first latching stopper 19. Of course, a stopper 37 may also be provided to an inlet of the hollow insert 13 of the second connecting rod 7 to prevent decoupling of the first connecting rod 1 therefrom.

Further, the first latching spring 23 is disposed between and supported by the two first latching pins 17, and a first oil path 21 may be connected to opposite ends of the first latching hole.

That is, when oil is supplied to the first latching hole 15 by an oil pump 35 through the first oil path 21, the first latching pins 17 are moved towards the middle portion of the first latching hole 15, at which the first latching pins 17 support the second end side of the first connecting rod 1.

On the contrary, when the oil pressure from the oil pump 35 is released, the first latching spring 23 forces the first latching pins 17 to oppositely move towards the opposite end sides of the first latching hole 15, so that the first latching pins 17 do not support the bottom of the first connecting rod 1 anymore.

Figure 4:
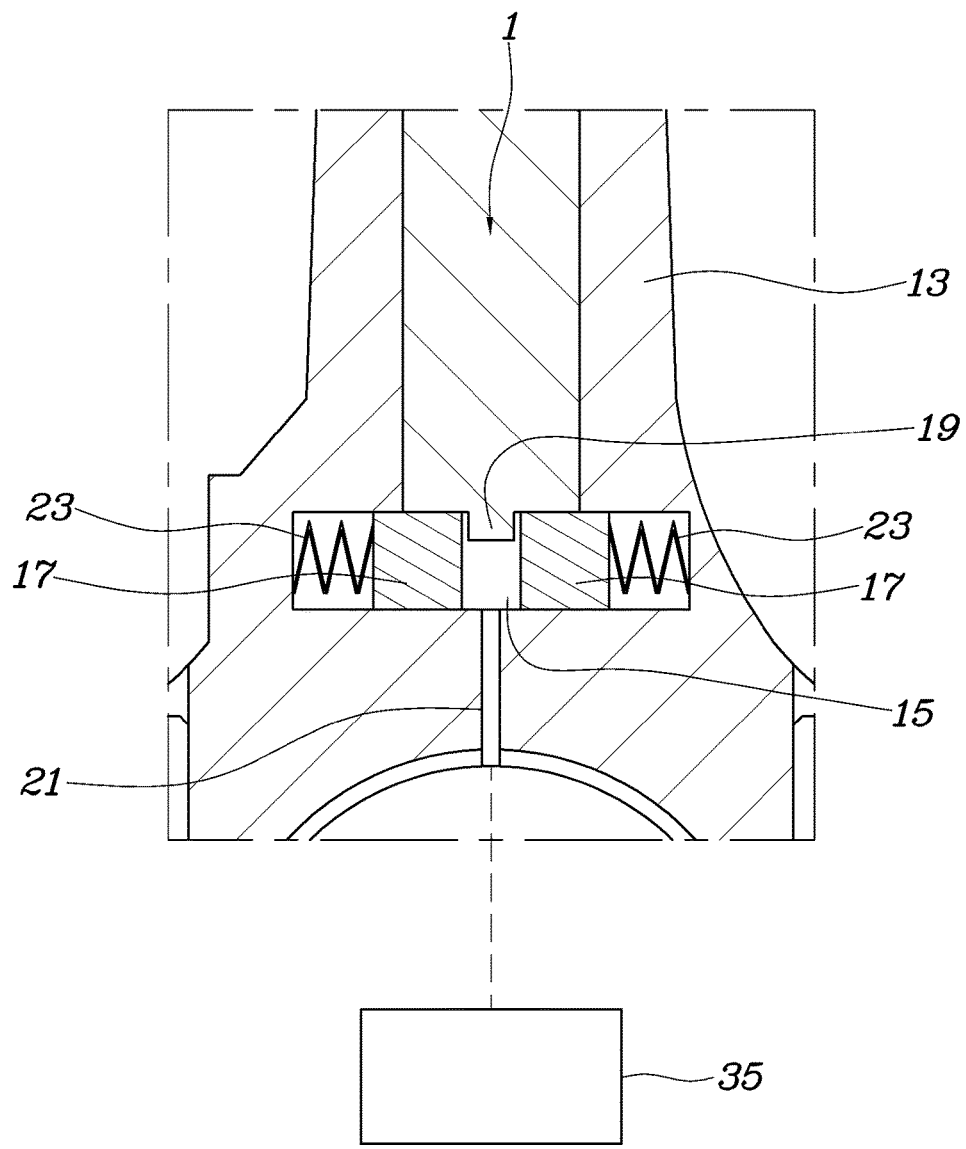
FIG. 4 is a partially enlarged view illustrating another configuration of a first latching mechanism in which a first latching pin is moved by the action of oil pressure and first latching springs.

In another form of the first oil path 21 and the first latching spring 23, as illustrated in FIG. 4, the second end side of the first connecting rod 1 is centrally provided with a first latching stopper 19 protruded towards the first latching hole 15, and two first latching pins 17 are respectively provided on opposite lateral sides of the first latching stopper 19.

In addition, two first latching springs 23 are disposed between the opposite end sides of the first latching hole 15 and the two first latching pins 17, respectively, and a first oil path 21 may be connected to the middle portion of the first latching hole 15 between the first latching pins.

That is, when oil is supplied to the first latching hole 15 by an oil pump 35 through the first oil path 21, the first latching pins 17 are moved towards the opposite ends sides of the first latching hole 15, at which the first latching pins 17 are located away from the first connecting rod 1 and do not support the second end side of the first connecting rod 1 anymore.

On the contrary, when the oil pressure from the oil pump 35 is released, the first latching springs 23 force the first latching pins 17 to move towards the middle portion of the first latching hole 15, so that the first latching pins 17 support the bottom of the first connecting rod 1.

Thus, the first latching mechanism prevents or allows the downward motion of the first connecting rod 1 at a raised level to increase or decrease the height of the piston 5, thereby providing high compression ratio or low compression ratio, respectively.

More specifically, referring to FIGS. 5 to 7, the configuration of the second latching mechanism is as follows.

A second latching hole 25 is formed on both the first and second connecting rods 1 and 7, wherein the second latching hole consists of a first hole part 25a and a second hole part 25b. The first hole part 25a is formed in an outer surface of the middle portion of the first connecting rod 1, and the second hole part 25b is formed in an inner surface of the hollow insert 13 of the second connecting rod 7.

Further, two second latching pins 27 are provided such that they are movable towards the first and second hole parts 25a and 25b, respectively. Specifically, the two second latching pins 27 mutually move towards or away from each other such that, in a state in which the first and second hole parts are level with each other, when the second latching pins 27 mutually move towards the first hole part 25a, they engage with both the first and second hole parts 25a and 25b, and when the second latching pins 27 mutually move towards the second hole part 25b, they mutually move away from the first hole part 25a.

That is, when the second latching pins 27 mutually move towards the first hole part 25a of the first connecting rod 1, they engage with both the first and second hole parts 25a and 25b, thereby mechanically preventing an upward motion of the first connecting rod 1.

Thus, the second latching mechanism prevents the upward motion of the first connecting rod 1 which has been lowered to decrease the height of the piston 5, thereby obtaining the low compression ratio.

On the contrary, when the second latching pins 27 mutually move towards the second hole part 25b of the second connecting rod 7, they are located away from the first hole part 25a and do not engage with the first connecting rod 1, thereby allowing the upward motion of the first connecting rod 1.

Thus, after being raised, the first connecting rod 1 is prevented from being moved by the first latching mechanism, which maintains the piston 5 at a raised position, thereby obtaining the high compression ratio.

Further, the second latching mechanism further includes an oil supply unit which provides oil pressure to allow the second latching pins 27 to move towards the first or second hole part 25a or 25b, and two second latching springs 23 which provide an elastic restoring force to the second latching pins 27, which has been moved with the oil pressure from the oil supply unit.

Figure 7:
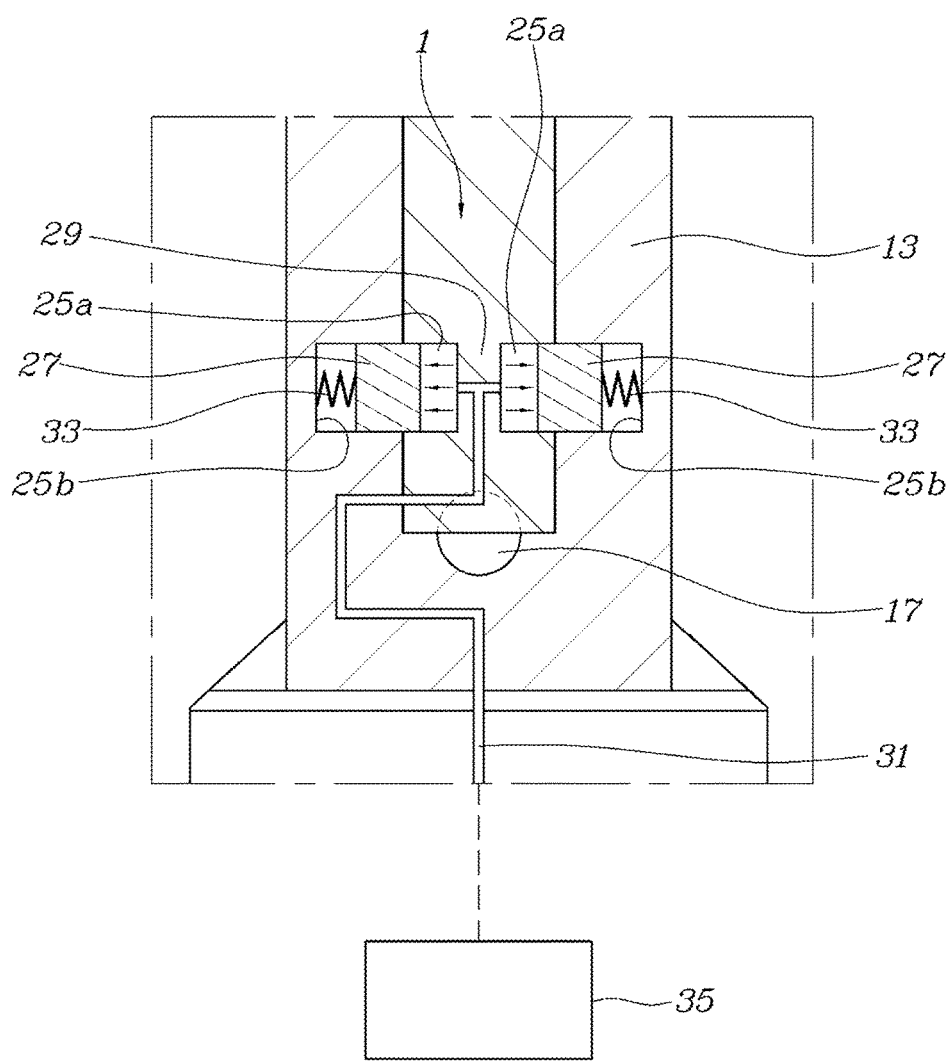
FIG. 7 is a partially enlarged view illustrating a configuration of a second latching mechanism in which a second latching pin is moved by the action of oil pressure and second latching springs.

In one form, referring to FIG. 7, the first connecting rod 1 is provided, on opposite sides on the outer surface thereof, with the first hole parts 25a, between which a second latching stopper 29 is formed.

In addition, the hollow insert 13 of the second connecting rod 7 is provided, on opposite sides on the inner surface thereof, with the second hole parts 25b, in which the second latching pins 27 are provided respectively.

Further, two second latching springs 33 are disposed between the opposite end sides of the second hole parts 25b and the second latching pins 27, respectively, and a second oil path 31 may be connected to the first hole parts 25a to supply oil thereto from the oil supply unit.

That is, when oil is supplied to the first hole parts 25a by an oil pump 35 through the second oil path 31, the second latching pins 27 mutually move towards the second hole parts 25b away from the first connecting rod 1, thereby allowing the movement of the first connecting rod 1.

On the contrary, when the oil pressure from the oil pump 35 is released, the second latching springs 33 force the second latching pins 27 to mutually move towards the first hole parts 25a and thus engage with both the first and second hole parts 25a and 25b, thereby preventing the movement of the first connecting rod 1.

Thus, the second latching mechanism prevents or allows the upward motion of the first connecting rod 1 at a lowered level to decrease or increase the height of the piston 5, thereby providing low compression ratio or high compression ratio, respectively.

The operation of the variable compression ratio engine will now be described.

First, a description will be made of the switching from the high compression ratio to the low compression ratio. In the high compression ratio shown in FIG. 1, when the oil pressure applied to the first oil path 21 is released, the first latching pins 17 move oppositely towards the opposite end sides of the first latching hole 15 with the spring force of the first latching spring 23.

Then, the first latching pins 17 move away from the first connecting rod 1, and do not support the bottom of the first connecting rod 1 anymore, thereby allowing the downward motion of the first connecting rod 1. At this time, of course, as illustrated in FIG. 2, the second latching pins 27 do not engage with the first hole parts 25a, but remain in the second hole parts 25b, and thus do not engage with the first connecting rod 1, thereby allowing the downward motion of the first connecting rod 1.

When the first connecting rod 1 then moves downwardly, the second latching pins 27 mutually move towards the first hole parts 25a by the spring force of the second latching spring 33.

Then, as illustrated in FIG. 6, the second latching pins 27 all engage with both the first and second hole parts 25a and 25b, thereby preventing the linear motion of the first connecting rod 1.

Thus, since the first connecting rod 1 is stopped at a lowered position by the second latching pins 27, the height of the piston 5 is decreased to obtain the low compression ratio.

Further, a description will be made of the switching from the low compression ratio to the high compression ratio. First, as illustrated in FIG. 7, the oil pressure is applied to the first hole part through the second oil path 31.

Then, the second latching pins 27 move oppositely towards the second hole parts 25b and thus do not engage with the first hole parts 25a, but remain in the second hole parts 25b. This does not restrict the movement of the first connecting rod 1 anymore, so that the first connecting rod 1 can move upwardly.

As such, when the first connecting rod 1 moves upwardly, as illustrated in FIG. 3, oil pressure is applied through the first oil path 21 to move the first latching pins 17 to the middle portion of the first latching hole 15, at which the first latching pins 17 can support the bottom of the first connecting rod 1.

Thus, since the first connecting rod 1 is stopped at a raised position by the first latching pins 17, the height of the piston 5 is increased to obtain the high compression ratio.

According to the present disclosure, when it is desired to change the compression ratio of the fuel/air mixture, the first or second latching pins 17 or 27 are moved to restrict or allow the rotation of the first connecting rod 1 so that the first connecting rod 1 can move linearly with respect to the second connecting rod 7, thereby variably adjusting the entire length of the connecting rod assembly.

This allows simply changing of the compression ratio and such a simple variable compression mechanism advantageously reduces the costs of designing the variable compression ratio engine.

Although an exemplary form of the present disclosure has been described for illustrative purposes, those skilled in the art will appreciate that various modifications, additions and substitutions are possible, without departing from the scope and spirit of the invention as disclosed in the present disclosure.

What is claimed is:

1. A variable compression ratio engine, comprising:
a first connecting rod having a first end side to which a piston is coupled, and a second end side;
a second connecting rod having a first end side formed as a hollow insert through which the second end side of the first connecting rod is reciprocatingly inserted, and a second end side coupled to a crank shaft; and
a latching unit including:
a first latching mechanism having a plurality of first latching pins and a first latching hole formed in the second connecting rod, and
a second latching mechanism having a plurality of second latching pins and a second latching hole which comprises a first hole part formed in the first connecting rod and a second hole part formed in the second connecting rod,
wherein the latching unit is configured such that first latching pins of the plurality of first latching pins are movable in the first latching hole, and second latching pins of the plurality of second latching pins are movable in the second latching hole so as to allow or restrict a linear motion of the first connecting rod relative to the second connecting rod, thereby inhibiting or preventing movement of the first connecting rod after having moved towards the piston or the crank shaft,
wherein the first latching pins of the plurality of first latching pins are configured to move in the first latching hole so as to support the first connecting rod having been raised towards the piston and restrict a motion thereof, and
wherein the second latching pins of the plurality of second latching pins are configured to engagingly move in at least one of the first hole part or the second hole part, which are aligned with each other, so as to restrict a motion of the first connecting rod having been lowered towards the crank shaft.

2. The variable compression ratio engine of claim 1, wherein the first latching hole of the first latching mechanism is provided in the second connecting rod at a position corresponding to the second end side of the first connecting rod and configured to extend in a direction orthogonal to a movement direction of the first connecting rod; and
wherein the first latching pins of the plurality of first latching pins are movable longitudinally towards a middle portion of the first latching hole of the first latching mechanism so as to support the second end side of the first connecting rod.

3. The variable compression ration engine of claim 2, wherein when the first latching pins of the plurality of first latching pins move away from the middle portion of the first latching hole of the first latching mechanism, the first latching pins of the plurality of first latching pins move away from the second end side of the first connecting rod.

4. The variable compression ratio engine of claim 2, wherein the first latching mechanism further includes:
- an oil supply unit configured to supply oil pressure to move the first latching pins towards the middle portion or either end side of the first latching hole; and
- a first latching spring configured to provide an elastic restoring force to the first latching pins moved by operation of the oil supply unit.

5. The variable compression ratio engine of claim 4, wherein
- the first connecting rod is provided, on the second end side thereof, with a first latching stopper protruded towards the first latching hole of the first latching mechanism,
- wherein two first latching pins among the first latching pins are respectively provided on opposite lateral sides of the first latching stopper,
- wherein the first latching spring is disposed between and supported by the two first latching pins, and
- wherein a first oil path is connected to opposite end sides of the first latching hole of the first latching mechanism to supply oil thereto from the oil supply unit.

6. The variable compression ratio engine of claim 2, wherein the first latching mechanism further includes:
- an oil supply unit configured to supply oil pressure to move the first latching pins towards the middle portion or either end side of the first latching hole; and
- two first latching springs disposed in the first latching hole,
- wherein the first connecting rod is provided, on the second end side thereof, with a first latching stopper protruded towards the first latching hole of the first latching mechanism,
- wherein two first latching pins among the first latching pins are respectively provided on opposite lateral sides of the first latching stopper,
- wherein the two first latching springs are disposed between opposite end sides of the first latching hole and the two first latching pins, respectively, and
- wherein a first oil path is connected to the middle portion of the first latching hole and the two first latching pins to supply oil from the oil supply unit.

7. The variable compression ratio engine of claim 1, wherein the first hole part of the second latching mechanism is formed in an outer intermediate surface of the first connecting rod;
- wherein the second hole part of the second latching mechanism is formed in an inner intermediate surface of the hollow insert on the second end side of the second connecting rod, into which the first connecting rod is inserted; and
- wherein the second latching pins of the plurality of second latching pins are movable towards the first hole part to engage with both the first and second hole parts, or towards the second hole part to move away and disengage from the first hole part.

8. The variable compression ratio engine of claim 7, wherein the second latching mechanism further includes:
- an oil supply unit configured to provide oil pressure to move the second latching pins of the plurality of second pins towards the first hole part or the second hole part; and
- a latching spring configured to provide an elastic restoring force to the second latching pins moved by operation of the oil supply unit.

9. The variable compression ratio engine of claim 8, further comprising:
- a latching stopper provided at a side of the first hole part; and
- an oil path connected to the first hole part to supply oil from the oil supply unit.

* * * * *